Sept. 29, 1964 — R. A. DEIBEL ETAL — 3,150,856
CONTROL VALVE
Filed Nov. 29, 1962
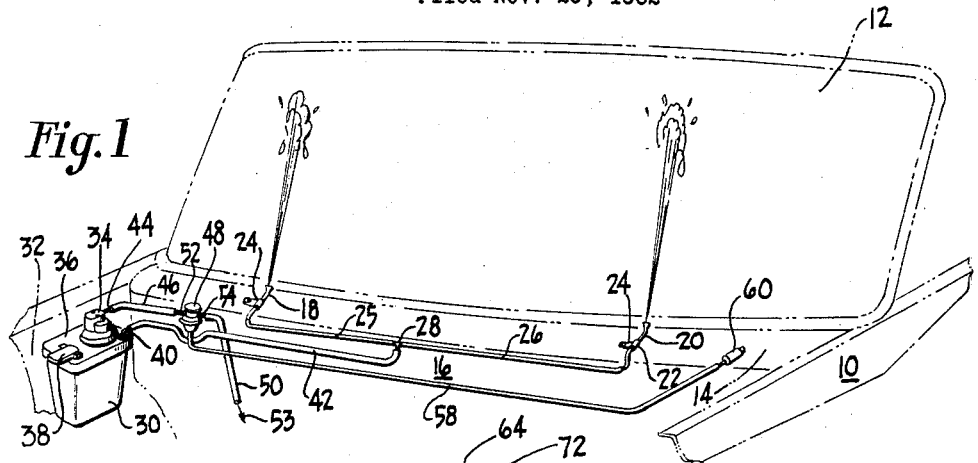
Fig. 1
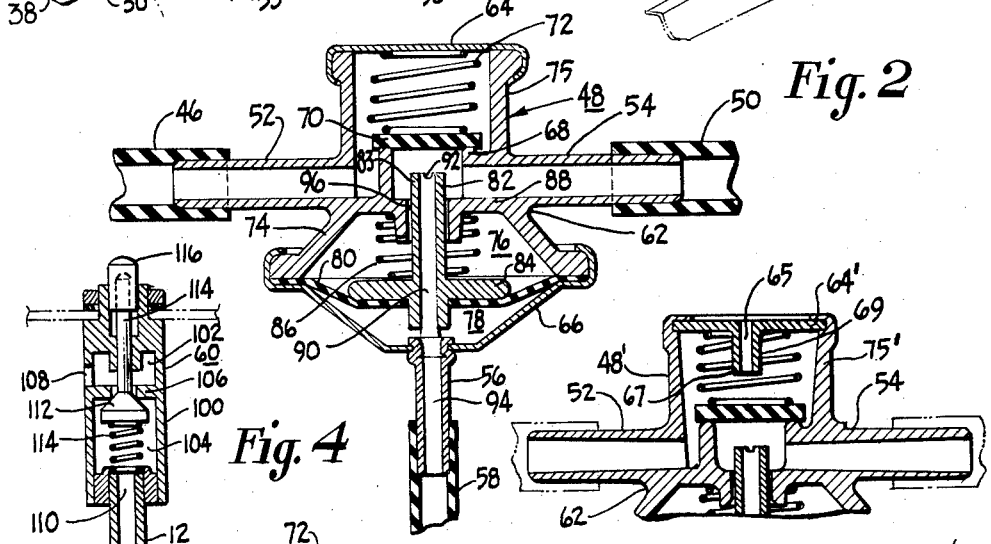
Fig. 2
Fig. 4
Fig. 5
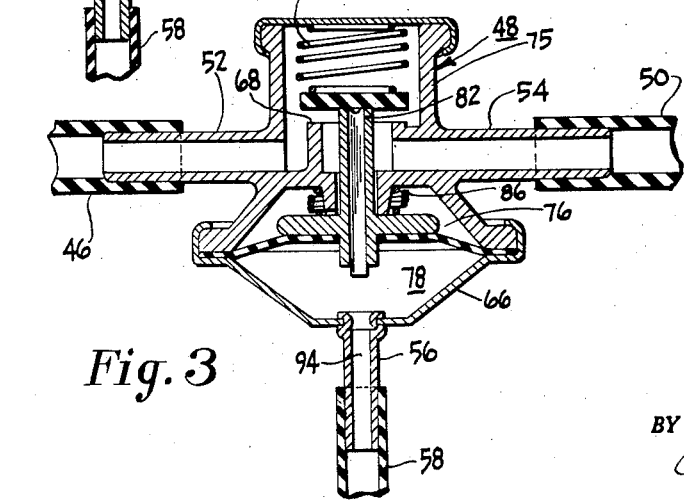
Fig. 3
INVENTORS
RAYMOND A. DEIBEL
and WILLIAM C. RIESTER
BY E. Herbert Liss
ATTORNEY

United States Patent Office 3,150,856
Patented Sept. 29, 1964

3,150,856
CONTROL VALVE
Raymond A. Deibel, Cheektowaga, and William C. Riester, Williamsville, N.Y., assignors to Trico Products Corporation, Buffalo, N.Y.
Filed Nov. 29, 1962, Ser. No. 240,791
7 Claims. (Cl. 251—35)

The present invention relates to an improved fluid actuated system, and more particularly to a fluid actuated system which includes an improved remotely controlled valve.

In fluid actuated systems, fluid passages constitute restrictions in the lines. Excessive restrictions impair the efficiency of the system and result in slow, sluggish operation of the devices. In many applications the actuator or control valve for initiating and discontinuing operation of the system must be located at one point, the fluid source at another point, and the apparatus at yet another point. Unduly long conduits may be required to carry the fluid from the source through the control valve to the apparatus.

Not only is the efficiency impaired by pressure drop due to the length of these lines, but installation of the assembly is difficult. Furthermore, the increased length of the conduits required increases the cost of the system.

These problems may be exemplified by a manually controlled windshield washing system in an automobile where the solvent reservoir and a pump therefor is at one location and the manual actuator must be at another location within reach of the operator. If the pump is vacuum operated from a pressure fluid reservoir or a manifold of an automobile, a conduit must extend from the pressure fluid reservoir to a control valve within reach of the operator and back to the washer pump at the solvent reservoir. This problem may exist in other installations and other applications as well.

A desirable solution to the problem would be to provide a control valve for the pressure fluid at or near the pressure source and to locate the apparatus to be actuated at or near the control valve. To accomplish this, it would be desirable to include a control valve which may be actuated manually or otherwise from a remote point. Such a control valve should be capable of rapid and reliable operation and must include means for prevention of self-actuation, and means for rapidly initiating and discontinuing operation. Where a vacuum system is employed for operation of the fluid actuated system, a diaphragm operated plunger for actuating the valve may be employed in which the diaphragm for actuating the plunger may be vacuum suspended. With this type of valve, self-actuation upon starting of the engine or other vacuum source must be prevented.

In addition, means must be provided for effecting release of the plunger to close the valve. In a manually operated, remotely controlled valve, a relatively large opening through the diaphragm is required to prevent self-actuation and a smaller opening is required for normalizing or equalizing pressure on opposite sides of the plunger diaphragm after discontinuing operation. A large opening during the operation of the system results in serious loss in efficiency. It is therefore desirable to provide a sufficiently large opening through the diaphragm when the valve is closed to prevent self-actuation and to close this opening during operation. It is also desirable to provide a small normalizing opening during operation in order that the pressure on opposite sides of the plunger diaphragm in the control valve may be normalized when it is desired to discontinue operation of the system.

Therefore, the principal object of the present invention is to provide a fluid actuated system which includes a remotely actuated control valve and relatively short fluid pressure conduits.

Another object of the invention is to provide a remotely controlled valve in a fluid actuated system which responds rapidly on both opening and closing.

A further object of the present invention is to provide an improved remotely controlled valve in a fluid actuated system which includes a vacuum suspended-diaphragm operated plunger for actuating the valve and in which means are provided for preventing self-actuation and, at the same time, includes means for normalizing pressure on opposite sides of the plunger diaphragm when it is desired to discontinue operation of the system.

A still further and more specific object of the invention is to provide an improved fluid actuated system which includes an actuating valve for a control valve at a point remote from the control valve and external to the fluid pressure system, a control valve within the fluid pressure system which includes a diaphragm operated plunger actuated valve in which the diaphragm is vacuum suspended and means for providing a sufficiently large opening through the diaphragm only when the valve is in closed position to prevent self-actuation and a sufficiently small normalizing opening through the diaphragm when the valve is in open position to prevent impairment of the efficiency of the valve.

By way of example and for purposes of illustration, the fluid actuated system of this invention and the unique remotely controlled valve is shown and described embodied in a windshield washer system for an automobile. It should be understood that although this is a particularly useful application of this invention, it is not limited thereto.

Other objects and advantages of the invention will be apparent from the following detailed description taken in connection with the accompanying drawings in which:

FIG. 1 is a partial perspective view of a motor vehicle embodying a fluid actuated windshield washer system in accordance with this invention;

FIG. 2 is a sectional view of the control valve of this invention shown in closed position;

FIG. 3 is a sectional view similar to FIG. 2 showing the control valve of this invention in open position;

FIG. 4 is a sectional view of a manually operated valve for actuating the control valve employed in the system of this invention; and FIG. 5 is a fragmentary sectional view similar to FIG. 2 showing a modified form of a control valve employed in this invention.

Briefly, there is shown and described a windshield washer system which includes a reservoir for windshield cleaning solvent, a pump for pumping the solvent through the windshield washer jets, a remotely controlled valve intermediate the pump, and a fluid source and a manually actuated valve for operating the remotely controlled valve. The remotely controlled valve assembly includes a valve intermediate a fluid pressure inlet which is in communication with the source and a fluid pressure outlet which is in communication with the pump. This valve controls communication and interruption of communication between the inlet and the outlet.

The valve is actuated by a diaphragm operated plunger wherein the diaphragm may be vacuum suspended. That is, in the closed or unenergized condition, opposite sides of the diaphragm are at sub-atmospheric pressure. To energize or to fluid actuate the plunger, fluid at higher pressure is admitted to the valve housing on one side of the diaphragm. This results in substantially instantaneous response to effect communication between the inlet and outlet of the valve to apply vacuum to the vacuum responsive elements of a fluid actuated system. The plunger is hollow and provides communication between the opposite sides of the diaphragm to prevent self-actuation when vacuum is suddenly applied to the inlet. The upper end of the plunger is notched to provide a small opening when the plunger is seated against the valve. This small opening provides a bleed for normalizing the pressure on opposite sides of the diaphragm when it is desired to reclose the valve.

Referring now to FIG. 1, there is shown in phantom a partial outline of a motor vehicle 10 which includes a conventional windshield 12 and a body portion or fire wall 14. A fluid actuated windshield washer system 16 embodying the present invention is shown mounted on the fire wall. A pair of washer jets 18 and 20, which may be secured in any suitable manner as for example by brackets 22 and 24, as shown, are mounted on the cowl of the vehicle. The jets are connected by conduits 25 and 26 through a T 28. A solvent reservoir 30 is secured to a side wall portion 32 within the motor compartment of the vehicle in any suitable manner. The solvent reservoir 30 may be a container of any suitable shape and material which is heat resistant and capable of holding a liquid. A vacuum operated pump 34 extends through the top wall 36 of the solvent reservoir 30. The pump 34 may be of any suitable construction, as, for example, the type shown in copending application Serial No. 72,466 filed November 29, 1960, now Patent No. 3,097,608, by R. A. Deibel and W. C. Riester, and assigned to the assignee of the present invention. A hinged cap 38 may be provided in wall 36 of the reservoir to cover an opening (not shown) for receiving a supply of solvent. An outlet nipple 40 extends through the wall 36 for transmitting fluid through a conduit 42 connected thereto at one end and to the T 28 at its other end.

The pump 34 includes a nipple 44 for connection to a vacuum source (not shown) through a conduit 46, control valve 48, and conduit 50 to the vacuum source, as indicated by the arrow 53. The control valve is connected to the conduit 46 by a nipple 52 and the conduit 50 is connected to the control valve 48 by a nipple 54. A third nipple 56 has secured thereto a conduit 58 through which the control valve 48 is connected to a manually operated valve 60. A conduit 58 admits atmospheric pressure to control valve 48 through manually operated valve 60.

Thus it can be seen that three independent fluid systems are employed in the fluid actuated system of this invention. First, there is a windshield washer solvent system comprising a solvent reservoir 30, an inlet to the pump 34, not visible, and a pump outlet including nipple 40 which transmits fluid to the windshield through conduit 42, T 28, conduits 24 and 26 to jets 18 and 20, respectively, and thence to the windshield 12. A second fluid system is the vacuum system which comprises a portion of pump 34, conduit 46, fluid pressure outlet 52 and inlet 54 of valve 48, and conduit 50 to a manifold or other vacuum source, as, for example, a vacuum reservoir. The third fluid system comprises valve 60 and conduit 58 to valve 48.

In operation, actuation of valve 60 admits atmospheric pressure to remotely controlled valve 48, opening the valve 48 to thereby open a vacuum system whereby vacuum pressure is transmitted from the vacuum source through conduit 50, valve 48, and conduit 46 to pump 34, thereby actuating pump 34. Actuation of pump 34 causes solvent to flow from the reservoir 30 through the outlet nipple 40, conduits 42, 24, and 26 to the jets 18 and 20.

Referring now to FIGS. 2 and 3, there is shown a preferred embodiment of the remotely controlled valve 48 in detail. The valve 48 includes a valve body 62 comprising a fluid control housing 75 formed in the upper portion, having an inlet or nipple 54, and an outlet or nipple 52. The fluid control housing 75 of valve body 62 may be closed at its upper end, as seen in FIG. 2, by a cap 64. A valve seat 68 is provided intermediate the valve inlet 54 and the valve outlet 52. A valve 70 is disposed in position to engage the valve seat 68. A compression spring 72 is disposed intermediate cap 64 and valve 70 to bias valve 70 to its closed position on valve seat 68. When the valve 70 is seated on valve seat 68, communication between inlet 54 and outlet 52 is interrupted.

As seen in FIGS. 2 and 3, the lower portion of valve assembly 48 includes an actuator assembly housing 74 closed at its lower end by a cap 66 which comprises a chamber 76 and a chamber 78 separated by a diaphragm 80. A plunger 82 extends through the diaphragm 80 and includes a hollow stem 83 and a radial flange 84 which seats on the diaphragm 80 and is movable therewith. A compression spring 86 is disposed intermediate the upper wall 88 of the actuator assembly housing 74 and the flange 84 of the plunger 82, thereby biasing the plunger 82 downwardly. The hollow stem 83 of the plunger 82 forms a passageway 90 for communication between opposite sides of the diaphragm 80 for a purpose to be explained hereinafter. The upper end of plunger 82 includes a notch 92. Although this is shown as a notch, it should be understood that any suitable irregularity may be provided on the upper end of plunger 82 which will form a minute interruption in the end surface. Nipple 56 includes a passage 94 which extends into and communicates with chamber 78 of valve actuating housing 74.

As seen in FIG. 2, the valve assembly 48 is in closed position wherein spring 72 biases the valve 70 to seat in position on valve seat 68 and communication is interrupted between inlet 54 and outlet 52. If it is desired to open the valve assembly 48 to permit communication between inlet 54 and outlet 52 for connection of outlet 52 to a vacuum source, as indicated by the arrow at 53, atmospheric pressure is admitted by suitable means through nipple 56 to chamber 78. Since chamber 76 is in communication through passageway 96, formed by the clearance between plunger 82 and the opening through upper wall 88 of valve assembly actuating housing 74, with a vacuum source, a pressure differential exists between chamber 76 and chamber 78 when atmospheric pressure is admitted to chamber 78 through passage 94. This pressure differential will drive diaphragm 80 and plunger 82 upward against the bias of spring 86. The plunger 82 will engage the lower surface of valve 70 and remove it from valve seat 68 against the bias of spring 72 to the position seen in FIG. 3. This places outlet 52 in communication with the inlet 54 and a vacuum source to cause actuation of the fluid actuated system and, in the instant example, specifically pump 34.

As can be seen in FIG. 3, in the open position, plunger 82 is seated against the lower side of valve 68 and substantially closes the large passageway 90, thereby providing communication between the vacuum source and chamber 78 through a relatively small opening formed by the notch 92 and the valve 70. So long as atmospheric pressure is provided through passage 94, the valve assembly 48 will remain in the open position seen in FIG. 3. But for the small opening formed by the notch 92 when atmospheric pressure is removed, the valve would tend to remain in the open position for a substantial period of time due to the trapped air at subatmospheric pressure in chamber 76. However, since leakage or bleeding through notch 92 is permitted, the chambers 76 and 78 will attain substantially equal pressure and return to a normalized state with no pressure differential. Thus spring 86 will drive plunger 82 downwardly and spring 72 will drive valve 70 to its closed position on seat 68.

It should now be apparent that the passage 90 through plunger 82 is essential to prevent self-actuation of the valve assembly 48. If, for example, the vacuum pressure should be removed from the valve assembly 48 and the valve were to be in dormant condition at substantially atmospheric pressure and if in this condition the engine of the automobile were started or a vacuum source was suddenly applied to inlet 54, the pressure in chamber 76 and the pressure in chamber 78 would become unbalanced, tending to actuate the plunger 82 when the vacuum were initially applied. This is prevented by the passage 90 whereby sudden application of vacuum to inlet 94 is transmitted to chamber 78 through passage 90 thereby keeping chambers 76 and 78 with no unbalanced condition. A relatively small opening would not accomplish this and self-actuation would take place. This highlights the unique function of passage 92. By seating the upper end of the plunger 82 against the valve 70, the large passage 90 is closed and permits rapid and efficient operation of the valve assembly 48. With a large opening such as the passage 92 during operation of the fluid actuated system, a much smaller pressure differential would exist between chambers 76 and 78, thereby resulting in slow and uncertain operation. However, with no passageway between the vacuum pressure source and the chamber 78, it would not be possible to close valve assembly 48 so long as the vacuum source was in communication with the valve assembly 48 because with no communication the pressure could not equalize between chambers 76 and 78. The notch at the upper end of plunger 82 permits the normalizing of the valve assembly actuating housing. Thus a control valve has been provided with a relatively large passage through the diaphragm 80 when the valve is in closed position to prevent actuation and a relatively small passage through the diaphragm 80 when the valve is in open position to provide normalizing communication between opposite sides of the diaphragm 80.

Atmospheric pressure may be admitted to valve assembly 48 through passage 94 in accordance with the broader aspects of this invention by any suitable means. But in accordance with the more specific aspects of this invention, a manually operated actuating valve as, for example, the valve shown in FIG. 4, is provided at admit atmospheric pressure to valve assembly 48 for actuating the valve assembly. The valve assembly 60 includes a valve body 100 having a chamber 102 and a chamber 104 separated by a valve seat 106. Valve chamber 102 has a vent opening 108 in communication with the atmosphere and valve chamber 104 has an opening 110 through a nipple 112 which communicates with conduit 58 through passage 94 in nipple 56 of valve assembly 48. A valve 112 having a stem 114 and a button 116 secured to the free end of the stem 114 is disposed within chamber 104 and is adapted to seal chamber 102 from 104 by seating on valve seat 106. The valve is urged into valve seat 106 by spring 114 which is disposed between the lower end of the valve 112 and the lower wall of the valve chamber 104 by manual actuation or depression of the button 116. The valve 112 is unseated against the bias of spring 114 to admit atmospheric pressure through opening 108 and valve seat 106 to passage 110, thence to conduit 58 to control valve assembly 48. So long as the button 116 remains depressed, the control valve 48 will remain open. When it is desired to discontinue operation of the fluid actuated system, the button 116 is released, thereby closing valve 112 on valve seat 106 to remove atmospheric pressure from the valve assembly 48. Bleeding through notch 92 will normalize the pressure on opposite sides of the diaphragm 80.

The operation of the invention should now be apparent. The invention as described herein is embodied in a windshield washer for a motor vehicle wherein the source of supply for actuating the control valve 48 is a manifold of the motor vehicle engine. When the engine is not operating, the system described herein is at atmospheric pressure. The diaphragm 80 of control valve 48 is in a position shown in FIG. 2 with chambers 76 and 78 both at atmospheric pressure. When the engine is started, a vacuum is drawn through conduit 50 causing the pressure in chambers 76 and 78 of control valve 48 to be at sub-atmospheric pressure, but the pressure on each side of the diaphragm 80 is equal. When it is desired to operate the washer, button 116 of actuating valve assembly 60 is depressed, opening valve 112, thereby opening conduit 58 to the atmosphere through opening 108 in chamber 102 and through chamber 104 of actuating valve assembly 60 where the atmospheric pressure is admitted through passage 90 of nipple or hose connection 56 to chamber 58. This causes diaphragm 80 and plunger 82 to move upward to the position shown in FIG. 3. This causes valve 70 to open, causing the vacuum to extend through conduits 50 and 46 to the pump 34, thereby actuating the pump. Actuation of vacuum pump 34 causes fluid from the solvent reservoir 30 to be pumped through conduit 42, T 28 and conduits 24 and 26 to the jets 18 and 20, thereby spraying the windshield 12 with washer solvent. When it is desired to discontinue spraying of the solvent, the button 116 is released. The valve 112 is closed by the bias of spring 114, thereby sealing chamber 102 from chamber 104 where the atmospheric pressure is no longer admitted to conduit 58 and chamber 78. Leakage or bleeding through notch 92 to chamber 78 through opening 90 and leakage through clearance 96 to chamber 76 equalizes the pressure in chambers 76 and 78, returning the diaphragm and plunger 82 to the position shown in FIG. 2. This returns valve 70 to its position seated on valve seat 68 thereby interrupting communication between conduit 50 and conduit 46. Operation of the pump is thus discontinued and spraying of the windshield 12 no longer occurs.

It is clear that upon initial starting of the vehicle engine, sudden vacuum in conduit 50 and through clearance 96 would lower the pressure of chamber 76 relative to chamber 78 causing momentary self-actuation of the plunger 82 were it not for the large passage 90 through the tubular plunger 82. It can be further seen that were this large opening 90 to remain open during operation of the washer system, serious loss of efficiency and sluggishness in operation would occur. This is avoided by the seating of the upper end of plunger 82 against the lower surface of valve 68.

It can be seen that in the operating position, were the passage 90 completely sealed, release of button 116 would not operate to interrupt the operation of the system since no means of equalizing the pressure or of permitting leakage of the system pressure to chamber 78 would be available in the absence of notch 92. Thus the fluid actuated washer system would continue to operate.

Thus, by this unique and novel construction, means are provided for preventing actuation upon introduction of vacuum in the fluid actuated system which is capable of being closed during operation to provide more efficient operation and further means are provided for normalizing the pressure on opposite sides of the diaphragm 80 when it is desired to discontinue operation. The said normalizing means is a small opening through notch 92 which has no significant effect upon the efficiency of the system. A novel and unique fluid actuated system capable of being controlled remotely and using relatively short conduits has been provided through utilization of a unique remotely controlled valve.

A modification of the remotely controlled valve 48 is illustrated in FIG. 5. This modified form of the valve 48 is denoted by the reference numeral 48'. Like reference numerals will be utilized to indicate identical parts and only the structure which is different from the structure of the valves shown in FIGS. 2 and 3 will be described in detail. The valve 48' comprises a valve body 62, an inlet nipple or connection 54 leading to a vacuum source and an outlet nipple or connection 52 leading to the device to be actuated. The valve assembly 48' includes a valve body 62 having a fluid control housing 75' similar to the FIG. 2 and FIG. 3 modification.

In the modification shown in FIG. 5, the fluid upper end of the fluid control housing 75 of the valve assembly 48' is closed by a cap 64' which includes an opening 65 through a nipple 69 extending into fluid control housing 75. The inner end of the nipple 69 forms a valve seat 67. This opening 65 may be utilized for connection to a second fluid source or as vent to the atmosphere.

The outlet 52 may be connected, alternatively, with one or the other of two sources of fluid pressure. The opening 65 constitutes a second inlet. In the more specific aspects of this invention, inlet 54 may communicate with a negative pressure source while inlet 65 may communicate with a positive pressure source. Thus, by actuation of the actuating valve 60, the fluid actuated system may be selectively connected with either a positive pressure source or a negative pressure source. When the valve assembly 60 is actuated to permit atmospheric pressure to enter the chamber 78, the valve 70 is unseated from its seat 68 and moves to a closed position on seat 67, thereby opening the outlet 52 to the negative pressure source through inlet 54. When the chamber 78 is closed to atmospheric pressure, the valve 70 moves to its closed position on valve seat 68 opening the positive pressure inlet 65, thereby permitting communication between a positive pressure source through inlet 65 and the outlet 52. Although inlet 65 has been described as a positive pressure inlet, it will of course be understood that in the broader aspects of this invention, inlet 65 may also be utilized to communicate with a negative pressure source independent from the negative pressure source communicating with inlet 54 or with the atmosphere. Thus in its broader aspects, the modification shown in FIG. 5 may be used for connecting the valve outlet 52 selectively to one of a pair of inlets.

Although certain specific embodiments of the invention have been shown and described for the purpose of illustration, it will of course be understood that in its broadest aspects, other modifications and embodiments may be made within the scope of the invention. For example, the invention need not be limited to a windshield washer system or to the operation of a pump, but may be employed for remotely actuating a valve which can control a fluid stream for operation of any fluid actuated device. Thus it should be understood that the present invention is not limited to the embodiments illustrated and described, but may be otherwise embodied within the scope of the following claims.

What is claimed is:

1. A remotely controlled valve assembly for controlling a fluid pressure stream in a fluid actuated system comprising a valve body including a fluid pressure inlet, a fluid pressure outlet, valve means for controlling communication between said inlet and said outlet, a plunger for actuating said valve means and a diaphragm for actuating said plunger, means for providing a pressure differential across said diaphragm to effect movement thereof, a first passage through said diaphragm open when said valve means is closed and closed when said valve means is open for preventing actuation of said valve means when said valve means is closed and a restricted second passage small relative to said first passage for normalizing pressure on opposite sides of said diaphragm when said means for providing a pressure differential has been interrupted.

2. A remotely controlled valve assembly for controlling a fluid pressure stream in a fluid actuated system comprising a valve body having a movable wall dividing said body into first and second chambers, inlet means for connecting said first chamber to a first source of fluid pressure, outlet means in said first chamber for connection to a fluid actuated system, valve means in said first chamber for controlling communication between said inlet means and said outlet means, a plunger operatively engaging said movable wall for engaging and actuating said valve means, means for effecting communication between said first and second chambers when said plunger is out of engagement with said valve means, aperture means for effecting restricted communication between said first and second chambers when said plunger is in engagement with said valve means, means for admitting pressure from a second fluid pressure source to said chamber, said first and second fluid pressure sources being at different values of pressure.

3. A remotely controlled valve assembly for controlling a fluid pressure stream in a fluid actuated system comprising a valve body having a movable wall dividing said body into first and second chambers, said first chamber including inlet means for admitting fluid thereto and outlet means for connection to a fluid actuated system, valve means in said first chamber for controlling communication between said inlet means and said outlet means, a plunger operatively engaging said movable wall and actuated thereby for engaging and actuating said valve means, control means for effecting a pressure differential across said movable wall, means for effecting communication between said first and second chambers when said plunger is out of engagement with said valve means and aperture means for effecting restricted communication between said first and second chambers when said plunger is in engagement with said valve means.

4. A remotely controlled valve assembly for controlling a fluid pressure stream in a fluid actuated system comprising a valve body including a fluid inlet and a fluid outlet, plunger operated valve means for effecting communication between said inlet and outlet when in one position and for interrupting communication between said inlet and outlet when in a second position, a diaphragm operated plunger for engaging and actuating said valve means to said one position and spring biasing means for actuating said valve means to said second position, a diaphragm dividing said body into first and second chambers and reciprocable therein for actuating said plunger, said plunger having one end extending through said diaphragm and its other end disposed for engaging and actuating said valve means, said plunger having a longitudinal opening therethrough, said opening being closed at said other end by engagement with said valve means and a restricted radial passage small relative to said longitudinal opening in said plunger adjacent said other end.

5. A remotely controlled valve assembly for controlling a fluid pressure stream in a fluid actuated system comprising a valve body having at least two fluid pressure inlets and a fluid pressure outlet, plunger operated valve means for selectively closing one and opening another of said fluid pressure inlets when in one position and for closing said another inlet and opening said one inlet when in a second position, a diaphragm operated plunger for engaging and actuating said valve means to said one position and spring biasing means actuating said valve to said second position, a diaphragm dividing said body into first and second chambers and reciprocable therein for actuating said plunger, said plunger having one end extending through said diaphragm and its other end disposed for engaging and actuating said valve means, said plunger having a longitudinal opening therethrough, said opening being closed at said other end when in engagement with said valve means and a restricted radial passage small relative to said longitudinal opening in said plunger adjacent said other end.

6. A remotely controlled valve assembly for controlling a fluid pressure stream in a fluid actuated system comprising a valve body having a movable wall dividing said body into first and second chambers, inlet means for connecting said first chamber to a source of vacuum, outlet means in said first chamber for connection to a fluid actuated system, valve means in said first chamber for controlling communication between said inlet means and said outlet means, a plunger operatively engaging said movable wall for engaging and actuating said valve means, means for effecting communication between said first and second chambers when said plunger is out of engagement with said valve means to thereby effect vacuum suspension of said movable wall, means for effecting restricted communication between said first and second chambers when said plunger is in engagement with said valve means, control means for admitting pressure from a fluid pressure source to said second chamber, said fluid pressure source being at higher pressure than said vacuum source.

7. A remotely controlled valve assembly for controlling a fluid pressure stream in a fluid actuated system comprising a valve body having a movable wall dividing said body into first and second chambers, said first chamber including inlet means for admitting fluid thereto and outlet means for connection to a fluid actuated system, valve means in said first chamber for controlling communication between said inlet means and said outlet means, a hollow, tubular, open ended plunger for engaging and actuating said valve means extending through and secured to said movable wall for movement therewith and forming a passage through said movable wall, said plunger having a restricted radial passage small relative to said passage through said movable wall, means for effecting a pressure differential across said movable wall, whereby said first and second chambers communicate through said plunger when said plunger is out of engagement with said valve means and whereby said communication is restricted through said radial passage when said plunger engages said valve means.

References Cited in the file of this patent

UNITED STATES PATENTS

| | | |
|---|---|---|
| 1,903,338 | Horne | Apr. 4, 1933 |
| 2,722,455 | Oishei | Nov. 1, 1955 |
| 3,018,136 | Williams | Jan. 23, 1962 |

FOREIGN PATENTS

| | | |
|---|---|---|
| 69,309 | Switzerland | Apr. 3, 1914 |
| 665,798 | Germany | Oct. 4, 1938 |